(12) United States Patent
Schindler

(10) Patent No.: US 6,268,905 B1
(45) Date of Patent: Jul. 31, 2001

(54) DEVICE FOR EXPOSING IMAGE INFORMATION

(75) Inventor: Hans-Georg Schindler, Holzkirchen (DE)

(73) Assignee: Agfa-Gevaert AG, Leverkusen (DE)

( * ) Notice: Subject to any disclaimer, the term of this patent is extended or adjusted under 35 U.S.C. 154(b) by 0 days.

(21) Appl. No.: 09/379,245

(22) Filed: Aug. 23, 1999

(30) Foreign Application Priority Data

Sep. 16, 1998 (DE) .............................. 198 42 457

(51) Int. Cl.$^7$ .......................... G03B 27/32; G03B 37/52; G03B 27/72

(52) U.S. Cl. ................. 355/64; 355/40; 355/41; 355/71; 355/35

(58) Field of Search .................. 355/20, 35, 40, 355/64, 67, 71, 125, 41; 430/30; 438/362

(56) References Cited

U.S. PATENT DOCUMENTS

| | | | | |
|---|---|---|---|---|
| 3,722,998 | * | 3/1973 | Morse | 355/71 |
| 3,758,207 | * | 9/1973 | Letzer | 355/80 |
| 4,239,385 | | 12/1980 | Hujer | 355/71 |
| 4,908,876 | * | 3/1990 | DeForest et al. | 382/261 |
| 5,313,726 | * | 5/1994 | Yaniv et al. | 40/361 |
| 5,467,165 | * | 11/1995 | Jacob et al. | 335/40 |
| 5,491,332 | * | 2/1996 | Inbar et al. | 250/221 |
| 5,633,725 | * | 5/1997 | Nishida et al. | 358/302 |
| 5,638,153 | * | 6/1997 | Zahn et al. | 355/35 |
| 5,798,821 | * | 8/1998 | Zahn et al. | 355/46 |
| 5,812,243 | * | 9/1998 | Waibel et al. | 355/38 |
| 5,890,305 | * | 4/1999 | Inbar et al. | 40/361 |
| 5,926,258 | * | 7/1999 | Mandl et al. | 355/71 |
| 5,959,722 | * | 9/1999 | Fussel et al. | 355/64 |
| 5,963,276 | * | 10/1999 | Inbar | 349/5 |
| 6,020,949 | * | 1/2000 | Yamada | 355/27 |
| 6,037,109 | * | 3/2000 | Fuessel et al. | 430/359 |

FOREIGN PATENT DOCUMENTS

| | | | |
|---|---|---|---|
| 28 20 965 | 11/1979 | (DE) | G03B 27/76 |
| 40 40 498 | 6/1992 | (DE) | G03C 5/08 |
| 44 20 637 | 12/1995 | (DE) | G03B 7/28 |
| 196 34 148 | 10/1997 | (DE) | H04N 1/40 |
| 196 18 476 | 11/1997 | (DE) | G03C 5/08 |
| 0 516 055 A2 | 5/1992 | (EP) | G03B 27/62 |
| 0 590 383 | 4/1994 | (EP) | G03B 27/52 |

* cited by examiner

*Primary Examiner*—Russell Adams
*Assistant Examiner*—Rodney Fuller
(74) *Attorney, Agent, or Firm*—Darby & Darby

(57) ABSTRACT

A device for exposing image information which is recorded on a photographic original (10) and is to be exposed onto a light sensitive medium (16; 12). An exposure assembly (25; 26; 31) is provided for outputting optical radiation which includes a plurality of adjustable area segments (44A, 44B) for adjusting the light intensity in certain local adjustment regions. A beam path (24; 33) is defined which directs the light to the light sensitive medium (16; 12). The exposure assembly (25; 26; 31) is arranged at a fixed location in the beam path (24; 33). An imaging sensor (12) capture a format of a region of the photographic original (10) containing to the image information to be copied. The device further includes a controller (14; 28) for setting a local adjustment region of the exposure assembly (25; 26; 31) depending on the format of the region to be copied. The exposure assembly (25; 26; 31) can be adjusted so that the intensity of the emitted and/or transmitted optical radiation can be adjusted in the defined local adjustment region.

15 Claims, 3 Drawing Sheets

DEVICE FOR EXPOSING IMAGE INFORMATION

BACKGROUND OF THE INVENTION

1. Field of the Invention

The present invention relates to a device for exposing image information which is recorded on a photographic original onto a light sensitive medium with exposure means for outputting optical radiation, wherein a beam path is defined through which the light passes to the light sensitive medium, and a capture means for capturing a format of a copy region of the photographic original containing to the image information to be copied.

2. Description of the Related Art

The quality of an optical image is, among others, significantly impacted by the appearance of stray light. This applies to both conventional and digital scanning and copying devices for photographic applications. Stray light may be significantly reduced with complex and expensive imaging optics and a complex optical imaging path.

Typically, however, the imaging optics, the optical path and the format of the light sensitive medium which is to be exposed with the image information, is adjusted to a predetermined format of the photographic original on which the image information is recorded.

Today's devices for photographic applications, however, should be able to process photographic original's having different formats. Such processable formats may, for example, include originals in miniature (35 mm) format (24×36 $mm^2$) as well as APS originals including panorama, high and classic formats. As a result, if an imaging optical path for exposing of image information is adapted to image information recorded in 35 mm format, then stray light is produced when image information recorded in, for example, a panorama format is exposed.

A solution for this problem was proposed in the published European patent application EP 0 590 383 A1. A paper mask was inserted between the imaging objective and the light sensitive photographic paper during the exposure of image information that is recorded on a photographic original in panorama format. The paper mask covers in the imaging path the upper and lower regions of the photographic original of the panorama format which do not contain image information, so that the photographic paper is not exposed (blackened) in these covered regions. The imaging optical path and, in particular, the film holder of the conventional exposure device are adjusted to match the full standard format of the photographic original.

The published European patent application EP 0 516 055 A2 discloses a different solution for the aforedescribed problem. Also in this case, the photographic copy device should be capable of exposing photographic originals in the full standard format as well as in the panorama format. As disclosed in this patent application, the format of the copy aperture in the holder are adjusted to correspond to the format of the photographic original to be exposed (standard or panorama). First, all photographic originals on the film which are in full format, are copied. The film is then repositioned so that in a second copying path all originals on the film are copied that are in the panorama format. For copying the originals in panorama format, a masking cover is inserted in the holder, wherein that masking cover has a copy aperture adapted to the panorama format of the originals.

The aforedescribed two devices require insertion of special mechanical copy masks into the optical imaging path in order to convert the imaging path from originals in full format to originals in panorama format. Such mechanical insertion processes are complex and subject to wear. Moreover, the process can only be adapted to one other format (panorama) through insertion of a conventional mask into the imaging path adapted for the full format.

SUMMARY OF THE INVENTION

It is therefore an object of the present invention, to provide a versatile device for exposing image information recorded on a photographic original which can be easily implemented and which images the image information on a light sensitive medium with high quality. This object is solved by utilizing exposure means comprising a plurality of adjustable area segments for adjusting the intensity of the light in certain areas. The exposure means is arranged at a fixed location in the beam path. The device further includes a control means for defining an area segment to be adjusted depending on the format of the copy region and for controlling the exposure means, so that the exposure means adjusts the intensity of the light to be supplied in the defined area section.

Accordingly, the exposure means is designed so as to provide an illumination with an intensity that depends on a previously captured format of a region of the original containing the image information to be exposed, and which can be adjusted over local adjustment regions. The exposure means is permanently installed in the imaging path which transmits the illumination to the light sensitive medium. A large number of a different spatial regions can then be easily adjusted independent from each other, so that the device of the invention can be used with photographic originals in many different formats. Such originals may be, for example, APS-P, H and C formats, standard 35 mm format, panorama and half-frames, enlargements of image sections from originals of varying formats or cropped photographic originals submitted for reprinting.

According to an advantageous embodiment of the invention, the exposure means includes an electro-optic element for adjusting the produced light intensity in predetermined local adjustment regions. In this way, a light source included in the exposure means and producing the optical radiation, can be dimensioned independent of the electro-optic element. In particular, the light source can be strong.

Such an electro-optic element may be liquid crystal display (LCD) or a so-called digital micro-mirror device (DMD).

It is also possible to employ as an exposure means a light source which already produces the emitted optical radiation in predetermined local adjustment regions. Such light source does not produce optical radiation in a local area where the intensity of optical radiation is to be turned off. Such light source may be, for example, a cathode ray tube (CRT). Alternatively, a light source of this type may include a plurality of light emitting diodes which can be independently spatially addressed.

In yet another advantageous embodiment of the invention, the device includes holding means for holding the photographic original. The holding means has an aperture with an aperture format. The control format determines the local region in which the intensity of the optical radiation is to be adjusted in response to the aperture format. Taking the aperture format into account is particularly advantageous for exposing cropped photographic originals which may be submitted for reprints, or with half frame formats where two originals are located in one conventional 35 mm frame.

In a particularly advantageous embodiment of invention, the control means generates control signals for the exposure means in order to reduce the large-area contrast of the image information to be exposed. The large-area contrast can be reduced easily with the help of the electrooptic elements included in the exposure means. An additional out-of-focus mask is a defined on the electro-optic element which readily reduces the large-area contrast.

Advantageously, the exposure means are arranged so as to emit the light in direct proximity of the photographic original that contains the image information to be exposed. In this way, the local region over which the intensity of the emitted optical radiation is to be adjusted, can be matched very precisely to the format of the original area containing the image information to be exposed. This approach reduces the stray light even more.

The invention and its advantages will be described hereinafter with respect to certain embodiments.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
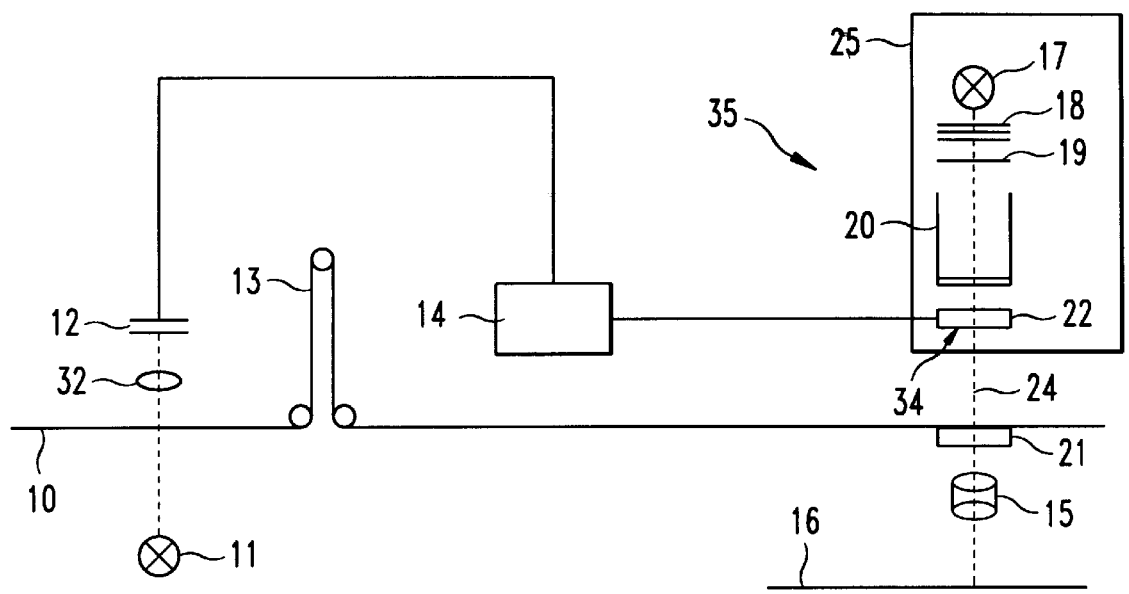
FIG. 1 is a first embodiment of a device according to the invention with an LCD in the copying imaging path of a photographic copy device.

In the following, identical reference numerals will be used for identical elements or for elements performing an identical function.

FIG. 1 shows the first embodiment of the device according to the invention for exposing image information which is used in a photographic copy device to copy originals onto photographic paper. Shown in FIG. 1 is a film 10, which is transported from left to right and initially passes through a scanner which includes a light source 11 and an image sensor 12. The image sensor 12 is a linear CCD sensor, but may also be an area sensor. The light emitted by light source 11 is imaged on the image sensor 12 through the original to be scanned, which is recorded on the film 10, and through an imaging objective 32. The scanner measures the density values of the original to be copied in order to adjust respective exposure values during the copy process using these density values. In addition, the scanner also provides means for measuring the format of the photographic original storing the image information to be copied. However, other arrangements can also be used to determine the format of the original to be copied. For example, the format of an APS film can be read with a magnetic reader, since APS films have a magnetic layer which contains information for each original indicating the format in which the original recorded on the film should be copied. In this case, it is not necessary to use the image sensor 12 to measure and analyze the format of the image data of the original to be copied.

After passing through the scanner, the film 10 continues to a decoupling loop 13 to ensure that at least a major portion of the originals recorded on the film 10 are scanned before the first image of the film 10 is copied. Another purpose of the decoupling loop 13 is to decouple the intermittent movement of the film 10 through the copying station from the continuous movement through the scanner.

The photographic copy device of FIG. 1 further includes a control means 14 coupled to the image sensor 12. The image data of an original recorded on the film 10 and measured by the image sensor 12 are transmitted to the control means 14 for processing. The control means 14 is adapted to determine the format of the respective photographic original based on the data transmitted by the image sensor 12. Such image formats may, for example, include standard 35 mm, panorama or half-frames or APS-P, C or H formats. However, an enlargement of a certain section of a one of the originals recorded on the film 10 may also be processed, wherein the control means 14 determine the respective format. Cut originals which are frequently submitted for reprints, can also be captured and processed with the device of the invention.

The photographic copy device of FIG. 1 includes a copy station 35 with an exposure means 25. The exposure means 25 has a copy light source 17, a color filter unit 18, a shutter 19, a mirror chute 20 and an addressable electro-optic element 22 which in the present example is in form of a liquid crystal display, LCD. The side of the LCD 22 facing away from the copy light source 17 represents an exit 34 of the illumination means 25.

The copy station 35 images the individual originals recorded on the film 10 through an imaging objective 15, which is implemented as a zoom objective, onto a light sensitive photographic paper 16. This arrangement of the components of the copy station 35 forms a copy imaging path 24 which directs the light emitted from the copy light source 17 to the photographic paper 16. A film holder 21 adapted to hold the originals to be copied is arranged in the imaging path 24 between the LCD 22 and the imaging objective 15. The film holder 21 includes a copy aperture designed for a predetermined aperture format. The aperture format is typically matched to a predetermined format of a photographic original. In the present example, the aperture format of the film holder 21 matches the standard 35 mm film format. In other words, the aperture has approximately the size of an original in the standard 35 mm film format. Typically, the standard format of the film is somewhat larger than the aperture of the film holder 21 to prevent marginal areas from being printed on the photographic paper 16.

The control means 14 is connected to the illumination means 25 and, in particular, to the LCD 22. The LCD 22 includes a plurality of individually addressable segments which can be switched on and off. If the segments of the LCD are switched on, then the light emitted by the light source 17 is transmitted at these locations. If the segments of the LCD 22 are switched off, then light emitted by the light source 17 is blocked, i.e., the light is not transmitted further in the direction of the photographic paper. In this way, arbitrarily selected spatial areas can be a defined where the light emitted by the light source 17 is removed from the beam path 24.

Since the scanner 11, 12 and the control means 14 can determine the format of the regions of the photographic originals of the film 10 that are to be copied and contain the image information to be exposed onto the photographic paper 16, the control means 14 can control the LCD 22 so as to form a mask on the LCD 22. The mask is formed on the LCD 22 by "darkening" or switching off certain segments of the LCD 22. This process defines spatial areas where the intensity of the light emitted by the light source 17 can be controllably adjusted, in this case blocked. The mask defined on the LCD 22 depends on the format of the original region containing the image information to be exposed as determined by the scanner 12 and the control means 14.

The control means 14 may, for example, determine that the format of a region of an original which is to be copied and recorded on the film 10, corresponds to the panorama format of the 35 mm film. The panorama format is a different from the standard format of the 35 mm film in that unexposed areas are present at the upper and lower margin of the panorama format. A mask is then defined on the LCD 22 for copying such panorama format of a 35 mm film, wherein the mask removes the upper and lower margin from the beam path 24 when the panorama format is copied in the copy station 35. The mask defined on the LCD 22 corresponds essentially to the difference between the size of the aperture of the holding means 21 and the exposure format of the original region on the film 10 to be copied. In addition, the mask on the LCD 22 is defined by the distance between the LCD 22 and the holding means 21. The closer the LCD 22 is to the original, the more precisely the correct mask can be set, thereby reducing stray light during exposure. Advantageously, the exit 34 of the illumination means 25 may be arranged in the region of the aperture of the film holder 21. For example, if by the scanner and the control means 14 detect an original in APS classic format on the film 10, then the control means 14 addresses the LCD 22 in such a way that a mask is produced on the left and right side of the LCD 22.

The photographic copy device of FIG. 1 can also use the LCD 22 to reduce a large-area contrast which may be present in the image information to be exposed. For this purpose, an additional mask is set on the LCD 22 which is imaged on the photographic paper 16 out of focus. This arrangement enhances the contrast of fine details contained in the image information to be imaged. Such a method for reducing the large-area contrast by out-of-focus masking is known, for example, from the German patent applications DE 40 40 498 or DE 196 34 148. By superimposing the two masks according to the invention—on one hand, for reducing the large-area contrast and, on the other hand, for adapting the beam path to the format of the original to be exposed—, a particularly effective device for exposing image information can be realized. The device is flexible and provides copies of excellent quality.

In the first embodiment according to FIG. 1, the LCD 22—as viewed from the light source 17—is located in front of the original on the film 10 to be imaged. Alternatively, the LCD 22 can also be arranged after the original. The respective format of the original regions containing the image information to be imaged as well as the position of the LCD 22, in particular the distance to the original areas, should be taken into account when the respective area segments of the LCD 22 are addressed. Different electro-optic elements, for example a so-called Digital micro-mirror device (DMD) or a PLZT, can also be used instead of the LCD.

Figure 2:
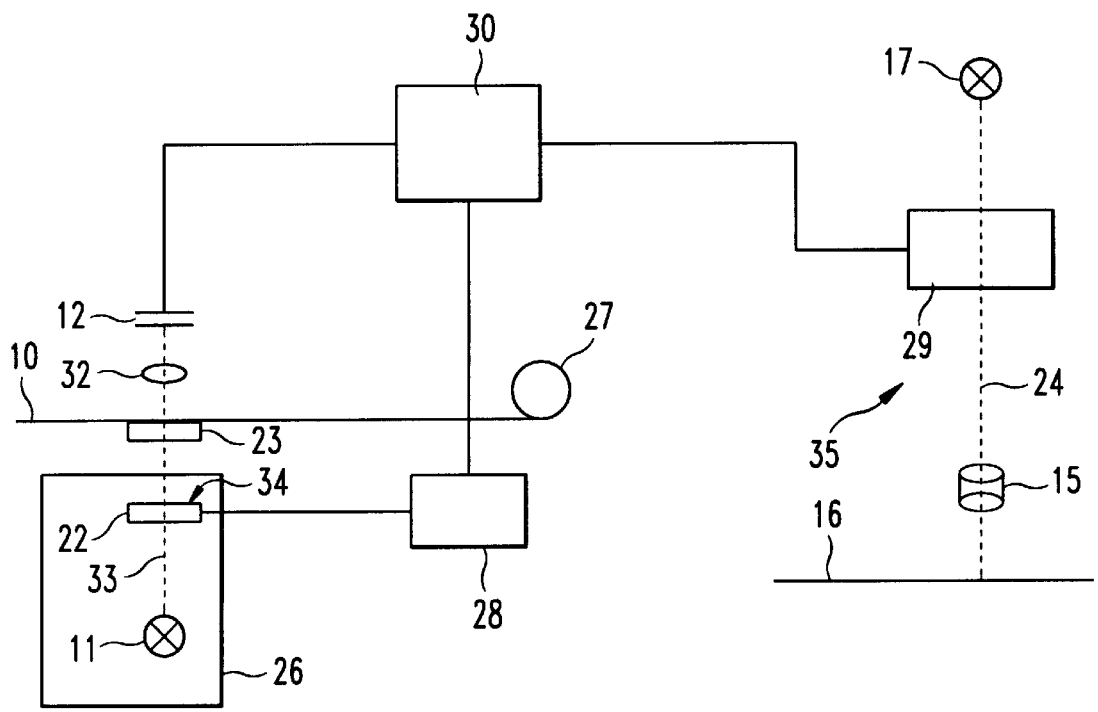
FIG. 2 is a second embodiment of the device according to the invention with an LCD in the copying imaging path of a scanner.

FIG. 2 shows a second embodiment of the device according to the invention, wherein the LCD is located in the exposure beam path of the scanner. Also illustrated in FIG. 2 is a second illumination means 26 which is inserted into the scanner for reading information from the originals recorded on the film 10. The illumination means 26 includes a scanner light source 11 and the LCD 22. The exit 34 of the LCD 22 faces away from the light source 11. The light emitted by the light source 11 is directed to the image sensor 12 through the LCD 22, through holding means 23 for holding the originals recorded on the film 10 and through the imaging objectives 32. This arrangement determines the scan beam path 33 which extends from the light source 11 to the image sensor 12. The scanner receives—as in the embodiment of FIG. 1—image data which are used for controlling the exposure of the copy station 35 and for determining the format of the region of the original that is to be copied to the photographic paper 16. The image data determined by the image sensor 12 are supplied to an evaluation means 30. The evaluation means 30 determines the exposure data for the copying process within the copy station 35. The copy station 35 includes a copy light source 17 and a modulator 29 which modulates the light emitted by the light source 17 according to the predetermined image information. A signal with the image information which is to be exposed onto the photographic paper 16, is transmitted from the evaluation means 30 to the modulator 29. The modulated light outputted by the modulator is imaged through the imaging objective 15 on the photographic paper 16. This arrangement defines—like in the embodiment of FIG. 1—a beam path 24 from the light source 17 to the photographic paper 16.

Because the second embodiment no longer uses the film originals for the actual copy process in the copy station 35, the film 10 is wound onto a spool 27 after passing through the scanner.

The image data measured by the image sensor 12 are transmitted via the evaluation means 30 to another control means 28 which determines from these image data the format of the original area on the film 10 containing the image information to be imaged. The control means 28 is connected to the exposure means 26 and, in particular, to the LCD 22. In the second embodiment—as in the first embodiment of FIG. 1—a mask is defined on the LCD 22 depending on the format of the original region to be copied. In this case, the light sensitive medium is the image sensor 12.

Figure 3:
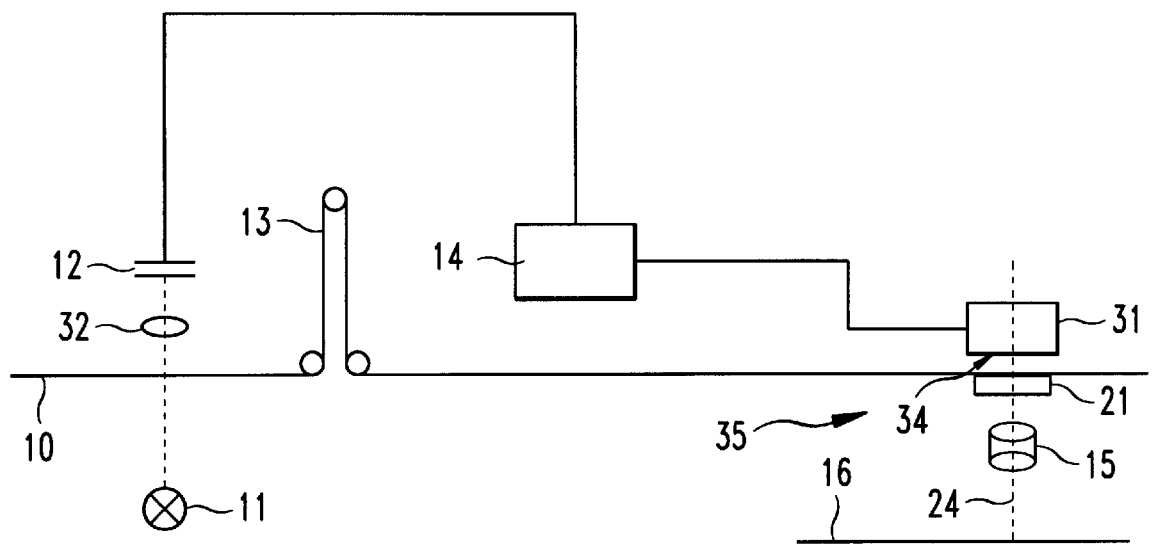
FIG. 3 is a third embodiment of the device according to the invention with an addressable CRT as a light source.

The third embodiment of the device according to the invention illustrated in FIG. 3 employs as a light source for copying the originals on photographic paper a controllable light source which is capable of generating optical radiation which can be adjusted depending on the spatial position. The light source used in the third embodiment is a cathode ray tube (CRT) 31. The CRT 31 is controlled by the control means 14. The control means 14 determines the format of the original to be copied based on the image data measured by the image sensor 12. The addressing scheme for the CRT 31 depends on the format. If the control means 14 detects, for example, that the original to be copied is in panorama format, then the respective upper and lower regions of the phosphor of the CRT 31 are not excited and do not produce light, so that the output 34 of the CRT 31 light emits light that has essentially a format corresponding to the panorama format. A different light source may be used instead of the cathode ray tube (CRT). The light source may, for example, include a plurality of light emitting diodes which can be spatially addressed so as to produce light emission matching the format of the original area to be copied. In this way, those areas of the original recorded on the film 10 and to be copied which are not shielded by the copy aperture disposed in the holding means 21 and which nevertheless should not be exposed on the photographic paper 16, are not illuminated at all by a light source.

Figure 4:
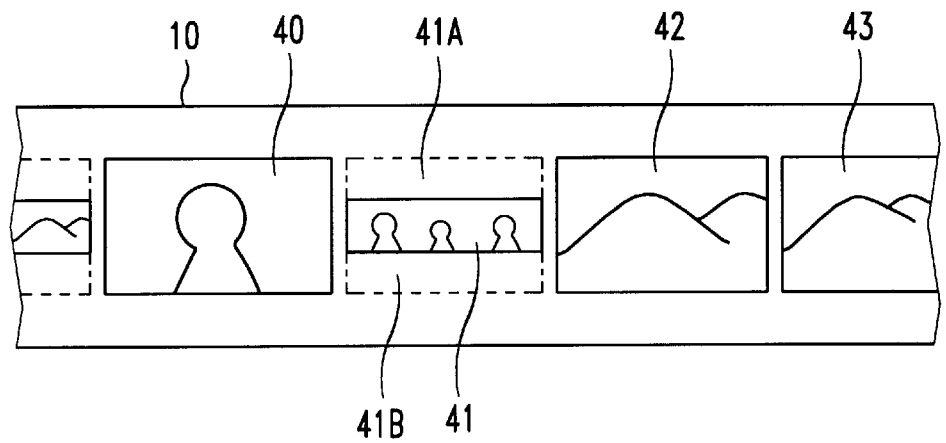
FIG. 4 is an example of a negative film with originals in standard 35 mm format and panorama format.

FIG. 4 shows an example of the negative film 10 on which different originals are recorded that can be processed with a photographic copy device of the type described with reference to FIGS. 1 to 3. The film 10 of FIG. 4 is a 35 mm film with originals in two different formats.

FIG. 4 shows four originals 40 to 43, wherein the first, third and fourth original 40,42 and 43, respectively, are recorded in the standard 35 mm format. The second original 41 is a recorded on the film 10 in panorama format. A comparison between the panorama format and the standard format shows a first region 41A above the panorama format and a second region 41B below the panorama format which do not contain image information. These two regions 41A and 41B thus represent areas where the intensity of the light beam produced by the exposure means should be adjusted. Consequently, the LCD 22 according to FIGS. 1 and 2 or the CRT 31 according to FIG. 3 is addressed in such a way that optical radiation is produced at the output 34 of the LCD 22 and the CRT 31, respectively, that is directed to the original 41 held by the holding means 21 and 23, respectively, whereby the two regions 41A and 41B are not illuminated by the optical radiation.

Figure 5:
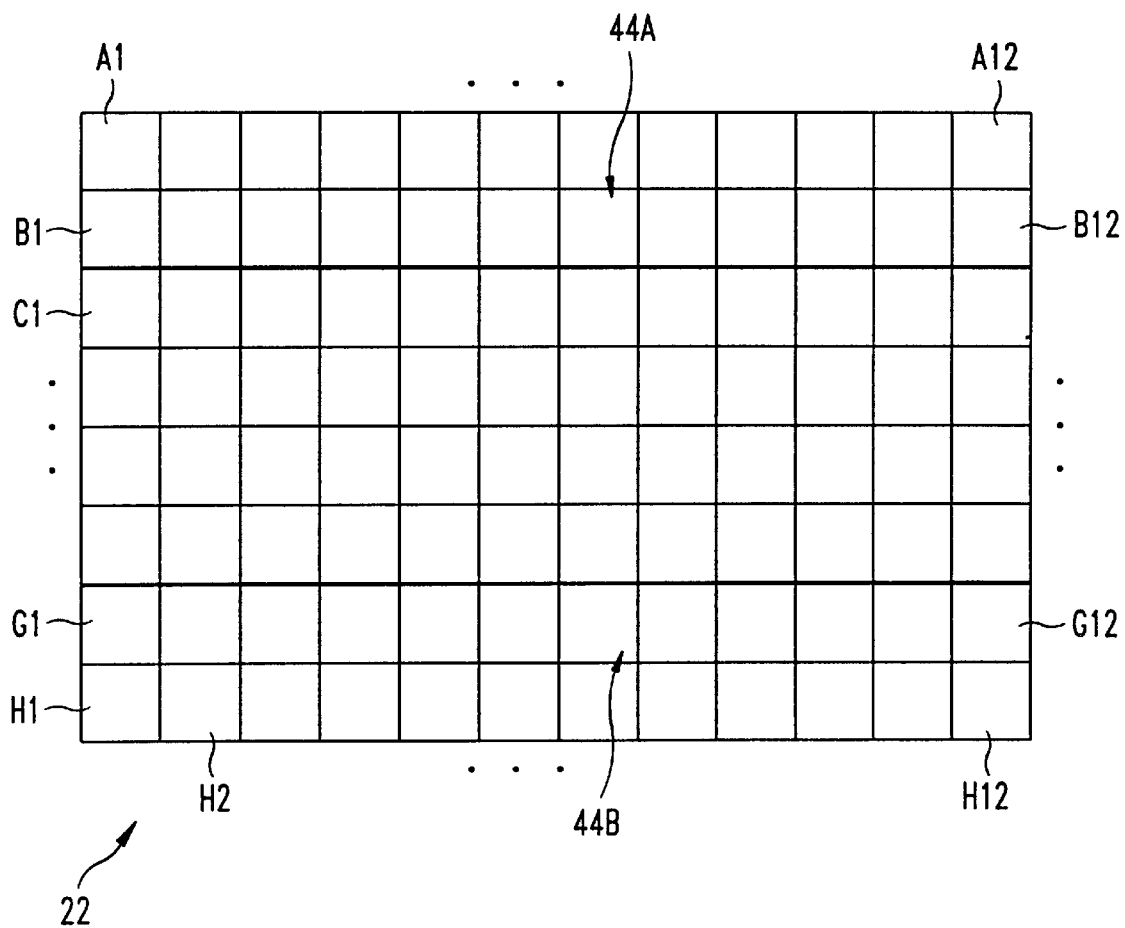
FIG. 5 is an example of an electro-optic element.

FIG. 5 shows an example of an electro-optic element in the form of the LCD 22. The LCD 22 has a plurality of individually addressable segments Al to A12, B 1 to B 12, . . . , H1 to H12. The different segments of the LCD 22 can be switched on or off, thereby either transmitting or blocking light impinging on the LCD in these areas. Any spatial area can therefore be easily blocked by creating a mask on the LCD 22, which is set according to the previously determined format of the original area to be exposed. FIG. 5 shows an upper area 44A which is produced by blocking or switching off the two upper rows consisting of the areas A1 to A12 and B1 to B12. FIG. 5 also shows a lower area 44B which is created by switching off the lower rows G1 to G12 and H1 to H12. Illumination directed onto the LCD 22 according to FIG. 5 is therefore blocked from the beam path in the upper and lower regions 44A and 44B, respectively, and is not transmitted by the LCD in the direction of the light sensitive medium. The mask generated by the LCD 22 can be used, for example, to image a panorama format on film 10 of the type shown as the second original of FIG. 4.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A device for exposing image information recorded on a photographic original including different image formats, onto a light sensitive medium, the device comprising
   exposure means for producing optical radiation,
   a beam path for passing light to the light sensitive medium;
   capture means for capturing the different image formats of the photographic original,
   the exposure means comprises a plurality of adjustable area segments for adjusting the intensity of the light in each of the area segments,
   the exposure means is arranged at a fixed location in the beam path,
   a controller, including image format information provided by the capturing means, is connected to the plurality of adjustable area segments of the exposure means, and is capable of determining which of the area segments are to be adjusted, depending on the different image formats, so that the exposure means adjusts the intensity of the light to be supplied in the determined area segments.

2. The device according to claim 1, wherein the plurality of adjustable area segments is an electro-optic element.

3. The device according to claim 2, wherein the electro-optic element is a liquid crystal display (LCD).

4. The device according to claim 2, wherein the electro-optic element is a digital micro-mirror device (DMD).

5. The device according to claim 1, wherein the exposure means comprises a light source for generating the optical radiation.

6. The device according to claim 5, wherein the light source is a cathode ray tube (CRT).

7. The device according to claim 5, wherein the light source comprises controllable light emitting diodes.

8. The device according to claim 7, wherein the device comprises holding means for holding the photographic original, and wherein the holding means includes an aperture with an aperture format and the controller is designed so as to determine the adjustable area segments also in dependence of the aperture format.

9. The device according to claim 8, wherein the controller is designed so as to generate control signals for reducing large-area contrast of the image information to be exposed through the exposure means.

10. The device according to claim 9, wherein the electro-optic element is designed so as to receive the control signals for reducing the large-area contrast and to adjust the optical radiation also in dependence of the control signals.

11. The device according to claim 10, wherein the exposure means is arranged so as to emit the light in direct proximity of the photographic original.

12. The device according to claim 11, wherein the light sensitive medium is photographic paper.

13. The device according to claim 11, wherein the light sensitive medium is an opto-electronic image converter.

14. The device according to claim 13, wherein an objective is arranged in the beam path for imaging the image information onto the light sensitive medium.

15. The device according to claim 13, wherein the opto-electronic image converter is a charge-coupled device (CCD) sensor.

* * * * *